United States Patent [19]
Romey et al.

[11] 3,836,343
[45] Sept. 17, 1974

[54] BRIQUETTE AND PROCESS FOR MAKING THE SAME

[75] Inventors: Ingo Romey; Georg Koelling, both of Essen, Germany

[73] Assignee: Bergwerksverband GmbH, Essen, Germany

[22] Filed: Mar. 14, 1973

[21] Appl. No.: 341,025

[30] Foreign Application Priority Data
Mar. 15, 1972 Germany............................ 2212460

[52] U.S. Cl. ...................... 44/25, 44/10 H, 44/10 I
[51] Int. Cl. ............................ C10l 5/14, C10l 5/40
[58] Field of Search ......... 44/6, 21, 25, 10 R, 10 G, 44/10 H, 10 I

[56] References Cited
UNITED STATES PATENTS
2,854,347  9/1958  Booth et al. ............................. 44/6

FOREIGN PATENTS OR APPLICATIONS
1,046,250  10/1966  Great Britain ......................... 44/25

*Primary Examiner*—C. Dees
*Attorney, Agent, or Firm*—Michael S. Striker

[57] ABSTRACT

A process for the production of smokeless carbon-containing briquettes is disclosed wherein particulate carbonaceous material is mixed with an aqueous suspension of copolymers of butadiene-acrylonitrile. The resulting mixture is compressed so as to form high strength smokeless briquettes.

11 Claims, No Drawings

BRIQUETTE AND PROCESS FOR MAKING THE SAME

BACKGROUND OF THE INVENTION

The invention relates generally to briquettes and a method of making the same. More particularly, the invention relates to carbon-containing briquettes and a method of making the same, with special reference to the materials which are used as binding agents in such briquettes.

Pitch and bitumen or bituminous earth, in amounts of 4–8 percent by weight, are normally used as binding agents in the production of carbon-containing briquettes. Such briquettes, however, have the disadvantage that large amounts of smoke are generated during their combustion. In addition, briquettes of this type decompose rapidly due to the fact that the binding agents are not stable at elevated temperatures and, as a result, soften or fuse at such temperatures.

Many other binding agents have already been proposed as substitutes for pitch and bitumen, among these being the synthetic resins. The use of dispersions containing polyesters of $\alpha,\beta$-unsaturated dicarboxylic acids and similar polyols having a minimum of two acetaldehyde atoms per molecule is known from German allowed application No. 1,268,103. Briquettes made from these types of materials, however, have the disadvantage that, subsequent to the compression required for forming the briquettes, these must undergo a 24 hour after-treatment at 50°C.

It is further known, from German allowed application No. 1,179,181, to use solid polymers and/or copolymers of olefinic hydrocarbons as binding agents in amounts up to a maximum of 4 percent of the weight of the combustible material. An example of briquettes produced in this manner are briquettes wherein polystyrene is used as a binding agent. Briquettes such as these, however, are not able to meet the necessary strength requirements. Thus, attempts have been made to increase the strength of the briquettes by adding to them polymers or copolymers and about 5 percent by weight of a coal-tar oil distillate such as, for example, coumarone oil, these additions constituting a total binding agent concentration of approximately 9 percent by weight. The disadvantage of briquettes of this type resides in the fact that they must be heated subsequent to briquetting in order to drive off the added oil. On the other hand, the use of synthetic resins such as copolymers of butadiene-styrene as binding agents lead to another disadvantage. These synthetic resins decompose and lose their binding capability at the temperatures required for mixing these with the particulate carbonaceous material to be briquetted. The same holds true at the briquetting temperature which lies between 150° and 260°C. In addition, the synthetic resins used heretofore are not able to sufficiently wet the particles of carbonaceous material.

SUMMARY OF THE INVENTION

It is, accordingly, an object of the invention to provide a smokeless briquette, i.e., a briquette which generates substantially no smoke upon combustion, and a process of making the same.

Another object of the invention is to provide a briquette which is stable at elevated temperatures, i.e., which does not decompose rapidly at elevated temperatures, and a process of making the same.

A further object of the invention is to provide a briquette and a process of making the same whereby no after-treatment of the briquette is required, i.e., whereby no treatment of the briquette subsequent to the compression required for forming the briquette is necessary.

It is also an object of the invention to provide a briquette having high strength, and a process of making the same.

A concomitant object of the invention is to provide a smokeless carbon-containing briquette which is possessed of high strength, is stable at elevated temperatures and requires no after-treatment, and a process of making the same.

An additional object of the invention is to provide a binding agent for briquettes which does not decompose at elevated temperatures.

Yet another object of the invention is to provide a binding agent for briquettes which does not lose its binding capability at elevated temperatures.

A supplementary object of the invention is to provide a binding agent for briquettes which is capable of wetting the material to be briquetted to a high degree.

In order to attain these and other objects, the invention provides a process for the production of carbon-containing briquettes, particularly briquettes which do not generate smoke upon combustion, which includes the steps of providing particulate carbonaceous material and forming an aqueous suspension of copolymers of butadiene-acrylonitrile. The carbonaceous material is mixed with the aqueous suspension and the resulting mixture is compressed to thereby produce high strength smokeless briquettes.

DESCRIPTION OF THE PREFERRED EMBODIMENTS

It has now been found that smokeless briquettes, i.e., briquettes which generate very little or no smoke upon combustion, having satisfactory properties in all regards may be obtained. This is accomplished by intimately mixing finely divided, i.e., particulate, carbon or carbonaceous material, having at most 18 percent by weight of volatile components, with an aqueous suspension of butadieneacrylonitrile copolymers. The copolymers normally contain between substantially 25 and 45 percent by weight of acrylonitrile per molecule. It, however, has been found to be particularly favorable when the aqueous suspension contains between 30 and 50 percent by weight of acrylonitrile per molecule of suspension. The mixture of carbon and aqueous suspension is then subjected to a pressure in the range of 50 to 800 atmospheres in excess of atmospheric pressure so as to form briquettes. The briquettes so produced are approximately equivalent to lumpy anthracite as regards resistance to pressure or compression, i.e., strength, generation of smoke during combustion and stability when exposed to flame, i.e., resistance to decomposition at elevated temperatures.

The use of copolymers of butadiene and acrylonitriles as binding agents in accordance with the invention has the result that the particulate carbon to be briquetted is completely wetted whereas the binding agent becomes bound to the individual carbon particles in known manner. Furthermore, the binding agent does not decompose even at temperatures as high as 260°C.

The latter finding is extremely surprising in view of the fact that the polymers and/or copolymers of olefinic hydrocarbons such as, for example, even the copolymers of butadiene-styrene, normally decompose at temperatures as low as 140°C.

Briquettes made with binding agents according to the invention require no treatment subsequent to briquetting, i.e., require no further treatment after compression. Rather, such briquettes are ready for use immediately upon cooling from the briquetting temperature.

The carbon particles to be briquetted should have a particle size in the range of 0.01 to 1 millimeter although it is preferable when the particle size lies in the range of 0.1 to 0.5 millimeters. In practice, the process of the invention is carried out by mixing the particulate carbon and the aqueous suspension in such proportions that the concentration of binding agent in the carbon is a maximum of 2 percent by weight. Usually, however, it will suffice when the binding agent is present in amounts of 0.5 to 1 percent by weight. Consequently, although the cost of the binding agents according to the invention is higher than that of other binding agents, the small amounts of the binding agents of the invention required make this difference in cost of no significance.

The carbon to be briquetted is mixed with a binding agent according to the invention in either a continuously or discontinuously operating intensive mixer. It is advantageous to perform the mixing operation at elevated temperatures, preferably at a temperature between 150° and 210°C. The hot mixture is then compressed in a briquette press so as to form briquettes, for example, egg-shaped briquettes. The compression of the hot mixture is advantageously carried out at temperatures of 110° to 260°C. The pressure to which the hot mixture is subjected should lie between 50 and 800 kp/cm². The briquettes are ready for use immediately upon cooling and are able to meet the most stringent requirements as regards resistance to compression, resistance to impact, generation of smoke during combustion and stability upon exposure to flame or heat. That is, the briquettes of the invention have high strength, generate little or no smoke upon combustion and will not decompose or will decompose only slowly at elevated temperatures.

EXAMPLE 1

1 kg of a copolymer of butadiene-acrylonitrile containing 28 percent by weight of acrylonitrile is placed in water so as to form an aqueous suspension having a solids content of about 45 percent by weight. The aqueous suspension is intensively mixed with 100 kg of finely ground lean coal, having a particle size of less than 0.3 millimeters, for 5 minutes at 210°C. The resulting mixture is subjected to a pressure of 300 atmospheres at a temperature of 300°C so as to form cylindrical briquettes having a diameter of 23 millimeters and a length of 30 millimeters. Each briquette weighs about 20 g. The so produced briquettes are ready for use upon cooling and are able to withstand a load of approximately 400 kp. They burn with a smokeless flame and remain stable when exposed to heat.

EXAMPLE 2

2 kg of a copolymer of butadiene-acrylonitrile containing about 40 percent by weight of acrylonitrile is placed in water so as to form an aqueous suspension having a solids content of approximately 40 percent by weight. The aqueous suspension is mixed in an intensive mixer at 150°C with 100 kg of anthracite having a particle size of less than 0.3 millimeters. The resulting mixture is placed in a press and subjected to a pressure of 500 atmospheres at 290°C so as to form briquettes having a diameter of 23 millimeters and a length of 25 millimeters. The so produced briquettes are able to withstand a maximum load of 450 kp and fulfill all requirements as regards resistance to flame or heat and smokeless combustion.

EXAMPLE 3

A copolymer of butadiene-acrylonitrile containing approximately 43 percent by weight of acrylonitrile is placed in water so as to form an aqueous suspension having a solids content of about 35 percent by weight. The aqueous suspension is intensively mixed with lean coal, having a particle size of less than 1 millimeter, for approximately 15 minutes in a kneading machine heated to a temperature of 170°C. The amount of butadiene-acrylonitrile copolymer in suspension corresponds to 0.5 percent by weight of the lean coal. The resulting mixture is subjected to a pressure of 100 atmospheres and a temperature of 230°C so as to form briquettes. These briquettes are able to withstand a pressure of 191 kg/cm².

It will be understood that each of the elements described above, or two or more together, may also find a useful application in other types of processes differing from the types described above.

While the invention has been illustrated and described as embodied in a briquette and process for making the same, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A process for the production of carbon-containing briquettes, particularly briquettes which do not generate smoke upon combustion, comprising the steps of providing particulate carbonaceous material; forming an aqueous suspension which includes a copolymer of butadiene-acrylonitrile; mixing said carbonaceous material with said aqueous suspension; and compressing the resulting mixture so as to form high strength substantially smokeless briquettes.

2. A process as defined in claim 1, wherein said carbonaceous material comprises at most 18 percent by weight of volatile components.

3. A process as defined in claim 1, wherein said carbonaceous material has a particle size between substantially 0.01 and 1 millimeter.

4. A process as defined in claim 1, wherein said carbonaceous material has a particle size between substantially 0.1 and 0.5 millimeters.

5. A process as defined in claim 1, wherein said copolymer comprises substantially 25–45 percent by weight of acrylonitrile per molecule.

6. A process as defined in claim 1, wherein said suspension comprises substantially 30–50 percent by weight of acrylonitrile per molecule.

7. A process as defined in claim 1, wherein the step of compressing comprises subjecting said mixture to a pressure between substantially 50 and 800 atmospheres in excess of atmospheric pressure.

8. A process as defined in claim 1; and further comprising the step of heating said mixture.

9. A process as defined in claim 8, wherein the steps of compressing and heating are performed simultaneously.

10. A process as defined in claim 8, wherein the step of heating comprises heating said mixture to a temperature between substantially 110° and 260°C.

11. A briquette formed by the process of claim 1.

* * * * *